C. KOONS.
Assignor to J. T. WILHIDE & BRO.
Animal-Trap.
No. 8,975. Reissued Nov. 18, 1879.
FIG. I.
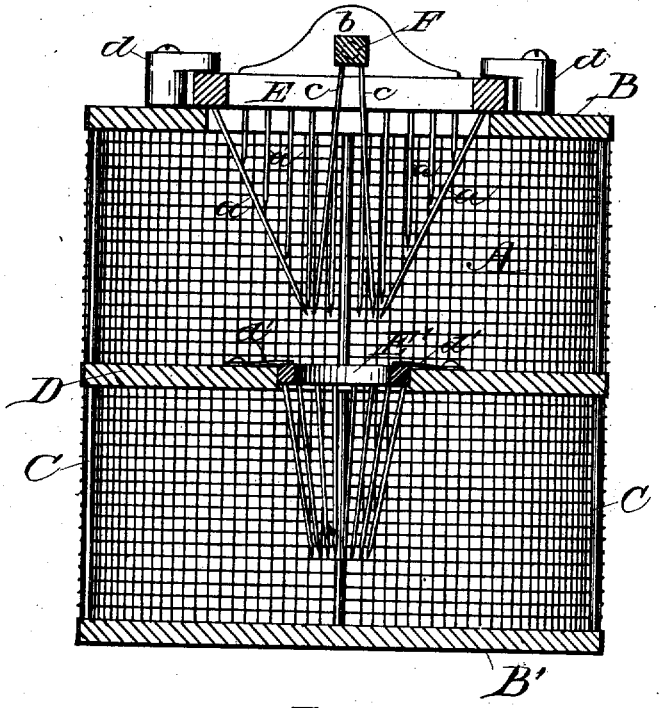
FIG. II.
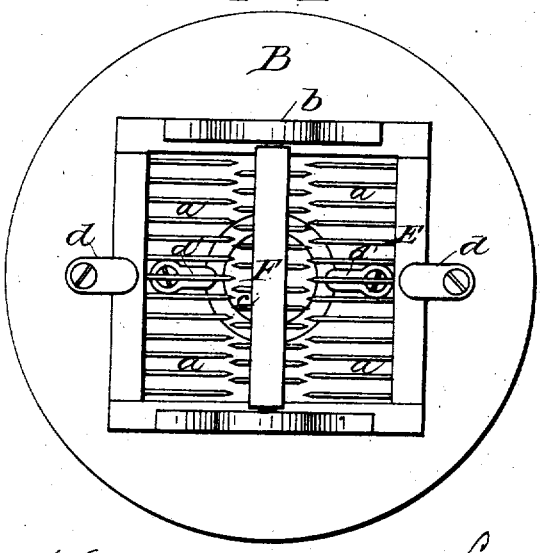
WITNESSES:
W. A. Redmond
F. B. Blanchard
INVENTOR:
Cornelius Koons,
by A. H. W. S. Howard,
atty.
N. PETERS, PHOTO-LITHOGRAPHER, WASHINGTON, D. C.

UNITED STATES PATENT OFFICE.

CORNELIUS KOONS, OF YORK ROAD, MARYLAND, ASSIGNOR TO J. T. WILHIDE & BROTHER.

IMPROVEMENT IN ANIMAL-TRAPS.

Specification forming part of Letters Patent No. 185,110, dated December 5, 1876; Reissue No. 8,975, dated November 18, 1879; application filed October 1, 1879.

*To all whom it may concern:*

Be it known that I, CORNELIUS KOONS, of York Road, in the county of Carroll and State of Maryland, have invented a new and Improved Animal-Trap; and I do hereby declare that the following is a full, clear, and exact description of the same, reference being had to the accompanying drawings, forming part of this specification, in which—

Figure I is a vertical central section, and Fig. II a plan view.

The object of my invention is to provide a simple, noiseless, and effective rat-trap, which shall be always set, and whose capacity for catching rats shall, in consequence, be only limited by its size.

This invention consists, first, in a door consisting of wires extending within the trap, part of said wires being fixed, and part constructed to be swung aside by the action of the animal on entering, and to automatically resume their original position, or position of rest, after the passage of said animal into the trap, the combined effect of the fixed and movable wires being to prevent his retreat.

Secondly, the invention consists in an apartment provided with a door consisting of inwardly-projecting fixed and movable wires, the latter being caused to automatically resume their original position, or position of rest, after the entrance of the animal; and, also, a second apartment communicating with the former by an opening having wires projecting into the said second apartment, whereby the return of the animal to the first apartment is prevented.

The invention consists, lastly, in certain details of construction found in the trap, as hereinafter set forth.

In the accompanying drawings, A represents a wire-cloth cage formed around the heads B B′ into a cylindrical or drum shape, and braced by vertical stay-rods C, which enter the said heads, and are securely attached to the same, so as to render the cage stiff and substantial. The said cage rests upon its end B′, and is divided into two apartments by a partition, D, into each of which apartments access is had by the rats through peculiarly-arranged inlets. To form the first or upper inlet a square hole is cut in the center of the head B, and above the same is fitted a square frame, E, provided with downwardly-projecting pointed wires *a*, arranged inclinedly upon two sides, and converging downward to form a tapering inlet.

In bearings *b* upon the top of the end bars of the frame E is journaled a shaft or cross-bar, F, armed with two diverging rows of downwardly-projecting pointed wires, *c*, which form a swinging gate, suspended centrally between the pointed wires of the tapering inlet. This gate permits the rats to push it to one side and have easy ingress to the interior; but by automatic action it immediately swings back to its central position in the mouth of the inlet to prevent the rats from escaping. The wires of this gate are made slightly shorter than those of the inlet, in order to prevent the rat from escaping by pushing it aside with his nose.

The frame, with its gate and inwardly-projecting wires, as thus described, is arranged upon the top of the head B so as to project inwardly through the opening, in which position it is securely held in a detachable manner by the buttons *d*, pivoted to the head so as to turn over the edges of the frame E to secure it, or be turned the other way to allow its removal.

The lower inlet leading to the lower apartment from the upper one is composed simply of inwardly-projecting converging pointed wires arranged in a circular metallic frame, E′, so as to form a tapering inlet, the said frame E′ being held detachably in place by buttons *d*′, after the manner of the one first described.

In making use of this rat-trap, bait of any kind is placed in the upper and also in the lower apartment, and the trap is then perpetually set for as many rats as the cage will hold. The rats, without hesitation, pass down into the first apartment, for the reason that the gate, by swinging to one side, accommodates itself to the size of the animal. He soon passes down into the lower apartment, and is there imprisoned. The upper apartment thus catches the rats, who afterward seek the lower apartment, making room for others above. After the entire space is occupied by the captured animals the latter are removed by loosening the buttons *d d'* and taking out the detachable frames E E' with their wires.

The advantages of the trap are that its capacity is only limited by its size, is noiseless, accommodates itself to any size of rat or mouse, and is always set. The trap being made of wire-cloth, one rat, which can be readily seen from outside, acts as a decoy for others. The trap is not liable to get out of order, and it is, as has been proven, thoroughly efficient for the purpose, the rats showing no hesitation in venturing past the swinging gate.

In attaching the wire-cloth to the heads B B' and partition D, bands or hoops of metal are used, which may be of sufficient width to prevent the bait from being thrown off from the floors of the apartments through the wire-netting.

I am aware that a drum-shaped trap with an upper and a lower compartment is not new; also, that in animal-traps tapering inlets with inwardly-projecting wires have long been used, and also that such tapering inlets have been made removable.

I am also aware that in a two-compartment drum-shaped trap the partition dividing the two compartments has been provided with a sheet-metal chute guarded by a wire falling door; but such, not forming the primary entrance to the trap, differs from my invention in its object. It is not intended to, neither will it, serve the purpose of the entrance shown in my trap, since the sheet-metal chute would obstruct a view of the bait placed in the trap, and render the trap inoperative in consequence. The construction of the chute-opening also differs materially from the opening formed of fixed and movable wires, constituting a feature of my invention.

I am also aware that in fish and animal traps it is not new, broadly, to form a gateway by wires adapted to open by the entrance of the fish or animal and close by their own gravity, and desire to state that I disclaim such movable wires unless combined with fixed wires forming a part of the gateway.

I am also aware that in traps a gateway has been guarded by spring-points adapted to admit the animal, but prevent his return; but such require too much force, and do not work to advantage.

Having described my improvements, I claim as my invention—

1. In combination with a cage-trap, a door consisting of wires extending into the trap, part of said wires being fixed and part pivoted, the latter being swung aside by the entrance of the animal and replaced by automatic action, the combined effect of the fixed and pivoted wires being to prevent the retreat of the animal, substantially as set forth.

2. In combination with a cage-trap, an apartment provided with a door consisting of inwardly-projecting fixed and pivoted wires, the latter being swung aside by the entrance of the animal and replaced by automatic action, and a second apartment communicating with the first and provided with a wire-guarded opening, substantially as set forth, whereby the animal, having been caught in the first apartment and received into the second, is prevented from returning to the first apartment.

3. The combination, with the tapering inlet to an animal-trap formed by inwardly-projecting pointed wires, of a pivoted swinging gate arranged centrally within said tapering inlet, substantially as and for the purpose described.

4. The tapering inlet composed of pointed wires and having a swinging gate, substantially as described, in combination with a wire cage having a partition forming two apartments, provided with an opening and pointed wires, forming a tapering inlet to the second apartment, substantially as described, and for the purpose set forth.

CORNELIUS KOONS.

Witnesses:
F. MEHRING,
S. WEANT.